United States Patent
Xu et al.

(10) Patent No.: US 12,506,663 B2
(45) Date of Patent: Dec. 23, 2025

(54) METHOD, APPARATUS, AND SYSTEM FOR TRAINING MANAGEMENT AND CONTROL MODEL

(71) Applicant: HUAWEI TECHNOLOGIES CO., LTD., Shenzhen (CN)

(72) Inventors: Ruiyue Xu, Shanghai (CN); Lan Zou, Shanghai (CN); Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 102 days.

(21) Appl. No.: 18/478,640

(22) Filed: Sep. 29, 2023

(65) Prior Publication Data

US 2024/0031240 A1    Jan. 25, 2024

Related U.S. Application Data

(63) Continuation of application No. PCT/CN2022/082872, filed on Mar. 24, 2022.

(30) Foreign Application Priority Data

Mar. 30, 2021 (CN) .......................... 202110343727.X

(51) Int. Cl.
  *H04L 41/14* (2022.01)
  *H04L 41/16* (2022.01)

(52) U.S. Cl.
  CPC ............ *H04L 41/145* (2013.01); *H04L 41/16* (2013.01)

(58) Field of Classification Search
  CPC ..... H04L 41/04; H04L 41/042; H04L 41/044; H04L 41/045; H04L 41/145; H04L 41/16;
  (Continued)

(56) References Cited

U.S. PATENT DOCUMENTS

2020/0367074 A1    11/2020  Zhang et al.
2020/0382968 A1    12/2020  Gupta et al.
(Continued)

FOREIGN PATENT DOCUMENTS

CN    109460396 A    3/2019
CN    111126626 A    5/2020

OTHER PUBLICATIONS

"3rd Generation Partnership Project; Technical Specification Group Services and System Aspects; Study on enablers for network automation for the 5G System (5GS); Phase 2 (Release 17)," 3GPP TR 23.700-91 V17.0.0, total 382 pages, 3rd Generation Partnership Project, Valbonne, France (Dec. 2020).
(Continued)

*Primary Examiner* — Vivek Srivastava
*Assistant Examiner* — William C Mcbeth
(74) *Attorney, Agent, or Firm* — Leydig, Voit & Mayer, Ltd.

(57) ABSTRACT

Embodiments of this application provide a method, an apparatus, and a system for training a management and control model. The method includes: receiving configuration information from a first network management unit, where the configuration information is used to configure a model training function, and the configuration information includes at least one of the following information: state information, for activating or deactivating the model training function; trigger information, for triggering model training; and data information, indicating data for model training. The method further includes performing model training based on the configuration information, to obtain network model information. According to embodiments of this application, a second network management unit configures the model training function based on the received configuration information sent by the first network management unit, to per-
(Continued)

form model training based on the configuration information, to obtain the network model information.

20 Claims, 5 Drawing Sheets

(58) Field of Classification Search
CPC ..... H04W 24/00; H04W 24/02; H04W 24/04; G06N 20/00
See application file for complete search history.

(56) References Cited

U.S. PATENT DOCUMENTS

| | | | | |
|---|---|---|---|---|
| 2021/0012239 | A1* | 1/2021 | Arzani | G06N 20/00 |
| 2022/0253678 | A1* | 8/2022 | Han | H04L 41/145 |
| 2022/0329493 | A1* | 10/2022 | Hong | H04L 41/145 |
| 2022/0377844 | A1* | 11/2022 | Kumar | H04L 41/16 |
| 2023/0216745 | A1* | 7/2023 | Chen | H04L 41/16 |
| | | | | 370/252 |
| 2023/0262728 | A1* | 8/2023 | Wu | G06N 20/00 |
| 2024/0049003 | A1* | 2/2024 | Rydén | H04W 24/02 |
| 2024/0306011 | A1* | 9/2024 | Zhang | H04L 41/16 |

OTHER PUBLICATIONS

"3rd Generation Partnership Project; Technical Specification Group Services and System Aspects; Management and orchestration; Study on enhancement of Management Data Analytics (MDA) (Release 17)," 3GPP TR 28.809 V1.1.0, total 93 pages, 3rd Generation Partnership Project, Valbonne, France (Nov. 2020).

"3rd Generation Partnership Project; Technical Specification Group RAN; Evolved Universal Terrestrial Radio Access (E-UTRA) and NR; Study on enhancement for Data Collection for NR and EN-DC (Release 17)," 3GPP TR 37.817 V0.1.0, total 8 pages, 3rd Generation Partnership Project, Valbonne, France (Jan. 2021).

* cited by examiner

METHOD, APPARATUS, AND SYSTEM FOR TRAINING MANAGEMENT AND CONTROL MODEL

CROSS-REFERENCE TO RELATED APPLICATIONS

This application is a continuation of International Application No. PCT/CN2022/082872, filed on Mar. 24, 2022, which claims priority to Chinese Patent Application No. 202110343727.X, filed on Mar. 30, 2021. The disclosures of the aforementioned applications are hereby incorporated by reference in their entireties.

TECHNICAL FIELD

This application relates to the field of network management technologies, and in particular, to a method, an apparatus, and a system for training a management and control model.

BACKGROUND

With introduction of vertical industries, an increase of a quantity of terminals, and diversified services, a network of an operator becomes increasingly more complex, making network operation and maintenance more difficult. How to reduce network operation and maintenance costs, simplify a network operation and maintenance process, and quickly deploy a network to meet the diversified services is an urgent point that needs to be improved for the network operation and maintenance.

At present, artificial intelligence (AI)/machine learning (ML) is introduced to a network management unit and a network element in a telecommunication system to implement an intelligent function of a network. The intelligence of the management unit and the network element depends on an AI/ML model. A network AI model training function is also introduced to the management unit and the network element to train a network AI model locally. Although the network AI model is trained locally, the operator needs to manage and control the training of the network AI model. Therefore, the operator needs to notify an operation and maintenance personnel of a device vendor of corresponding requirements for training management and control, and the operation and maintenance personnel of the device vendor needs to locally control the training of the network AI model through a local manual interface. The operator cannot control the local network AI model training function online in real time. Therefore, manual efficiency is low and manpower is consumed.

SUMMARY

This application discloses a method, an apparatus, and a system for training a management and control model, to flexibly manage and control a network AI model training function.

According to a first aspect, an embodiment of this application provides a method for training a management and control model, including: receiving configuration information from a first network management unit, where the configuration information is used to configure a model training function, and the configuration information includes at least one of the following information: state information, for activating or deactivating the model training function; trigger information, for triggering model training; and data information, indicating data for model training; and performing model training based on the configuration information, to obtain network model information.

According to this embodiment of this application, a second network management unit configures the model training function based on the received configuration information sent by the first network management unit, so as to perform model training based on the configuration information, to obtain the network model information. According to this method, an operator can flexibly configure a corresponding network AI model training function, so that network model training can be managed and controlled, thereby improving the efficiency of management and control model training and saving manpower.

This embodiment of this application further provides a method for training a management and control model, including: receiving configuration information from a first network management unit, where the configuration information is used to configure a model training function, and the configuration information includes at least one of the following information: state information, for activating or deactivating the model training function; trigger information, for triggering model training; and data information, indicating data for model training; and sending the configuration information to a network element, so that the network element performs model training based on the configuration information, to obtain network model information.

According to this embodiment of this application, the second network management unit sends the configuration information to the network element based on the received configuration information sent by the first network management unit, so that the network element performs model training based on the configuration information. According to this method, network model training can be managed and controlled, and the operator can flexibly configure a corresponding network AI model training function.

In an optional implementation, the configuration information further includes at least one of the following: data source information, indicating a data source for model training, where the data source is an entity that provides training data, and may be a network element list, a management function unit list, a database list, or the like; model information associated with the model training function, indicating a model for model training, where for example, the associated network AI model information indicates an output network AI model object, for example, may be an identifier of the network AI model object; and type information of a model, indicating a model type for model training, where for example, the type information of the model includes at least one of the following: a load information analysis model, a service experience analysis model, a network performance analysis model, a congestion analysis model, a quality of service (QOS) analysis model, an energy saving analysis model, a traffic direction analysis model, a massive multiple input multiple output Massive MIMO analysis model, and a user equipment (UE) track analysis model.

The data source information enables the operator to configure a network AI model training data source. According to this method, a training function of a network model can perform training based on data of a data source specified by an operator. In addition, compared with a local control method, in this solution, the efficiency of management and control model training can be improved, and manpower can be saved.

The model information associated with the model training function enables the operator to configure a network AI model for model training. According to this method, a training function of a network model can perform training based on model information specified by an operator. In addition, compared with a local control method, in this solution, the efficiency of management and control model training can be improved, and manpower can be saved.

The type information of the model enables the operator to flexibly configure a type supported by the network AI model training function. According to this method, a training function of a network model can perform training based on a model type specified by an operator. In addition, compared with a local control method, in this solution, the efficiency of management and control model training can be improved, and manpower can be saved.

In an optional implementation, the network model information includes at least one of the following: a network model identifier, a network model version, a network model file storage address, and a network model file name. The network model identifier is, for example, a network model 1I. The network model version may be, for example, v1.0.0. The network model file storage address may be, for example, a uniform resource identifier (URI) or an Internet Protocol (IP) address. The network model file name may be, for example, a name of the network model file.

In still another optional implementation, the method further includes: sending the network model information to the first network management unit.

According to this method, the first network management unit can obtain, in real time, the network AI model information output through training.

In another optional implementation, the method further includes: determining association information between the configuration information and the network model information; and sending the association information to the first network management unit.

The association information between the configuration information and the network model information may be understood as follows: The network model information is obtained through training based on one or more pieces of configuration information, and the one or more pieces of configuration information has an association relationship with the network model information.

According to this method, the first network management unit can obtain the association information between the configuration information and the network model information in real time.

In an optional implementation, the trigger information includes at least one of the following: a training period, indicating a model training period, where for example, the training period indicates that the network AI model training function needs to perform training based on an exemplary period, for example, the exemplary period is hourly, daily, or weekly; a training time, indicating a model training time, where for example, the training time indicates that the network AI model training function performs training at an exemplary time point; and training indication information, indicating to start model training, that is, the network model training is performed immediately.

The foregoing state information enables the operator to flexibly activate or deactivate a corresponding network AI model training function. According to this method, the training function of the network model can perform training based on state information specified by the operator.

The trigger information enables an operator to configure trigger information of the network AI model training. According to this method, the training function of the network model can perform training based on trigger information specified by the operator.

In an optional implementation, the data information includes: input data, indicating an input data type of the model; and output data, indicating an output data type of the model. For example, if a massive multiple input multiple output (Massive MIMO) mode optimization model is supported, the input data may be a reference signal received power (RSRP), a signal to interference plus noise ratio (SINR), and a downlink/uplink throughput (DL/UL throughput); and the output data may be a tilt angle, an azimuth, and the like in a massive MIMO pattern coverage scenario.

The data information enables the operator to configure a network AI model training data type. According to this method, the training function of the network model can perform training based on a data type specified by the operator.

According to a second aspect, an embodiment of this application provides a method for training a management and control model, including: determining configuration information, where the configuration information is used to configure a model training function, and the configuration information includes at least one of the following information: state information, for activating or deactivating the model training function; trigger information, for triggering model training; and data information, indicating data for model training; and sending the configuration information to a second network management unit.

According to this embodiment of this application, the first network management unit determines the configuration information of the model training function, and sends the configuration information to the second network management unit. According to this method, network model training can be managed and controlled, and the operator can flexibly configure a corresponding network AI model training function.

In an optional implementation, the configuration information further includes at least one of the following: data source information, indicating a data source for model training; model information associated with the model training function, indicating a model for model training; and type information of a model, indicating a model type for model training.

In an optional implementation, the method further includes: receiving network model information sent by the second network management unit, where the network model information is obtained after the second network management unit performs training based on the configuration information, or the network model information is obtained after a network element performs training based on the configuration information, and the configuration information is received by the network element from the second network management unit.

Optionally, the network model information includes at least one of the following: a network model identifier, a network model version, a network model file storage address, and a network model file name.

In another optional implementation, the method further includes: receiving association information sent by the second network management unit, where the association information is association information between the configuration information and the network model information.

In an optional implementation, the trigger information includes at least one of the following: a training period, indicating a model training period; a training time, indicating a model training time; and training indication information, indicating to start model training.

In another optional implementation, the data information includes: input data, indicating an input data type of the model; and output data, indicating an output data type of the model.

According to a third aspect, an embodiment of this application provides an apparatus for training a management and control model, including: a receiving module, configured to receive configuration information from a first network management unit, where the configuration information is used to configure a model training function, and the configuration information includes at least one of the following information: state information, for activating or deactivating the model training function; trigger information, for triggering model training; and data information, indicating data for model training; and a processing module, configured to perform model training based on the configuration information, to obtain network model information.

Optionally, the configuration information further includes at least one of the following: data source information, indicating a data source for model training; model information associated with the model training function, indicating a model for model training; and type information of a model, indicating a model type for model training.

In an optional implementation, the network model information includes at least one of the following: a network model identifier, a network model version, a network model file storage address, and a network model file name.

In an optional implementation, the apparatus further includes: a sending module, configured to send the network model information to the first network management unit.

In another optional implementation, the apparatus further includes: a determining module, configured to determine association information between the configuration information and the network model information, and send the association information to the first network management unit.

The trigger information includes at least one of the following: a training period, indicating a model training period; a training time, indicating a model training time; and training indication information, indicating to start model training.

In an optional implementation, the data information includes: input data, indicating an input data type of the model; and output data, indicating an output data type of the model.

According to a fourth aspect, an embodiment of this application provides an apparatus for training a management and control model, including: a determining module, configured to determine configuration information, where the configuration information is used to configure a model training function, and the configuration information includes at least one of the following information: state information, for activating or deactivating the model training function; trigger information, for triggering model training; and data information, indicating data for model training; and a sending module, configured to send the configuration information to a second network management unit.

In an optional implementation, the configuration information further includes at least one of the following: data source information, indicating a data source for model training; model information associated with the model training function, indicating a model for model training; and type information of a model, indicating a model type for model training.

In an optional implementation, the apparatus further includes: a receiving module, configured to receive network model information sent by the second network management unit, where the network model information is obtained after the second network management unit performs training based on the configuration information, or the network model information is obtained after a network element performs training based on the configuration information, and the configuration information is received by the network element from the second network management unit.

In an optional implementation, the network model information includes at least one of the following: a network model identifier, a network model version, a network model file storage address, and a network model file name.

In another optional implementation, the receiving module is further configured to: receive association information sent by the second network management unit, where the association information is association information between the configuration information and the network model information.

In an optional implementation, the trigger information includes at least one of the following: a training period, indicating a model training period; a training time, indicating a model training time; and training indication information, indicating to start model training.

In still another optional implementation, the data information includes: input data, indicating an input data type of the model; and output data, indicating an output data type of the model.

According to a fifth aspect, this application provides a computer storage medium, including computer instructions. When the computer instructions are run on an electronic device, the electronic device is enabled to perform the method provided in any one of the possible implementations of the first aspect and/or any one of the possible implementations of the second aspect.

According to a sixth aspect, an embodiment of this application provides a computer program product. When the computer program product is run on a computer, the computer is enabled to perform the method provided in any one of the possible implementations of the first aspect and/or any one of the possible implementations of the second aspect.

According to a seventh aspect, an embodiment of this application provides an apparatus for training a management and control model, including a processor and a memory. The memory is configured to store program code, and the processor is configured to invoke the program code to perform the method provided in any one of the possible implementations of the first aspect and/or any one of the possible implementations of the second aspect.

According to an eighth aspect, an embodiment of this application provides a system for training a management and control model, including the apparatus provided in any one of the possible implementations of the third aspect and/or any one of the possible implementations of the fourth aspect.

According to a ninth aspect, an embodiment of this application provides a method for training a management and control model, including: determining, by a first network management unit, configuration information, where the configuration information is used to configure a model training function, and the configuration information includes at least one of the following information: state information, for activating or deactivating the model training function; trigger information, for triggering model training; and data information, indicating data for model training; and sending, by the first network management unit, the configuration information; receiving, by a second network management unit, the configuration information; and performing, by the second network management unit, model training based on the configuration information, to obtain network model information.

It may be understood that, the apparatus according to the third aspect, the apparatus according to the fourth aspect, the computer storage medium according to the fifth aspect, the computer program product according to the sixth aspect, the apparatus according to the seventh aspect, and the system according to the eighth aspect that are provided above are all configured to perform the method according to any one of the first aspect and the method according to any one of the second aspect. Therefore, for beneficial effects that can be achieved by the method, refer to beneficial effects in the corresponding method. Details are not described herein again.

According to a tenth aspect, a chip is provided. The chip is coupled to a memory, and performs the method for training a management and control model according to the first aspect or any one of the implementations of the first aspect of embodiments of this application.

According to an eleventh aspect, a chip is provided. The chip is coupled to a memory, and performs the method for training a management and control model according to the second aspect or any one of the implementations of the second aspect of embodiments of this application.

According to a twelfth aspect, a chip is provided. The chip is coupled to a memory, and performs the method for training a management and control model according to the ninth aspect of embodiments of this application.

It should be noted that "coupling" in embodiments of this application indicates a direct combination or an indirect combination of two components.

BRIEF DESCRIPTION OF DRAWINGS

The following describes the accompanying drawings used in embodiments of this application.

DESCRIPTION OF EMBODIMENTS

The following describes embodiments of this application with reference to the accompanying drawings in embodiments of this application. Terms used in implementations of embodiments of this application are merely used to explain exemplary embodiments of this application, and are not intended to limit this application.

It should be noted that an AI/ML model in embodiments of this application may be a mathematical model which generates a prediction by searching for a mode in data in machine learning. For example, the network AI/ML model is a data model which generates a prediction of network performance mainly by searching for a mode in network data, for example, a network traffic prediction model. A type of the model is not specifically limited in embodiments of this application.

Model training in embodiments of this application may be understood as a process of finding a target configuration parameter and determining a target model by using a large amount of data to achieve a target of a high recognition rate. For example, network model training mainly describes a relationship between network data, for example, may be a configuration parameter value in different network environments.

Figure 1:
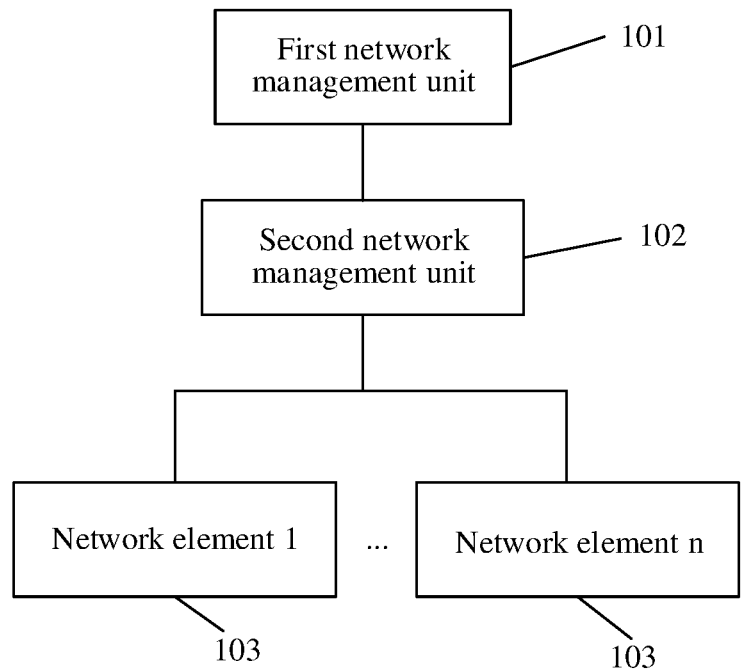
FIG. 1 is a schematic diagram of an architecture of a system for training a management and control model according to an embodiment of this application.

FIG. 1 is a schematic diagram of an architecture of a system for training a management and control model according to an embodiment of this application. As shown in FIG. 1, the system for training a management and control model includes a first network management unit 101 (which may be more, and is not shown in the figure), a second network management unit 102 (which may be more, and is not shown in the figure), and a network node set 103 (which is shown in the figure and includes n network nodes) managed by the second network management unit 102. A function of the first network management unit 101 may be set on an independent device/apparatus, or may be set on a device/an apparatus having another function. The device/apparatus on which the function of the first network management unit 101 is set is referred to as a first network management device/first network management apparatus. For ease of description, in embodiments of this application, the first network management unit, the first network management apparatus, or the first network management device is uniformly referred to as the first network management unit. Similarly, a function of the second network management unit 102 may be set on an independent device/apparatus, or may be set on a device/an apparatus having another function. The device/apparatus on which the function of the second network management unit 102 is set is referred to as a second network management device/second network management apparatus, and the second network management unit, the second network management apparatus, or the second network management device is uniformly referred to as the second network management unit. In a possible solution, the first network management unit may be a network management system (NMS), a cross domain management function (Cross-Domain MnF) unit, or may be referred to as a network management function (NMF) unit, or a business support system (BSS). The second network management unit may be an element management system (EMS), or a domain management function (Domain MnF) unit, or may be referred to as a subnetwork management function (NMF) or an element management function unit (network element/function management function).

The network element may be a core network element, or may be a wireless network element. The core network element includes but is not limited to: a mobile switching center (MSC), a gateway mobile switching center (GMSC), a serving general packet radio service (GPRS) support node (SGSN), a gateway GPRS support node (GGSN), a mobility management entity (MME), a serving gateway (SGW), a packet gateway (PGW), an access management function (AMF) device, a user plane function (UPF) device, and a session management function (SMF) device. The wireless network element includes but is not limited to a base station and a base station controller, and the base station may be a global system for mobile communication (GSM) base station, a universal mobile telecommunications system (UMTS) base station, a long term evolution (LTE) base station, or a new radio (NR) base station, where the LTE base station is also referred to as an evolved NodeB (eNB), and the new radio base station is also referred to as a gNodeB (gNB). The base station controller may be a GSM base station controller or a UMTS base station controller.

In the system for training a management and control model, the first network management unit determines configuration information, and sends the configuration information to the second network management unit, and the second network management unit performs model training based on the configuration information, to obtain network model information. Alternatively, the second network management unit sends the configuration information to a network element, so that the network element performs model training based on the configuration information, to obtain the network model information. The configuration information is for configuring a model training function, and the configuration information includes at least one of the following information: state information, for activating or deactivating the model training function; trigger information, for triggering model training; and data information, indicating data for model training.

Figure 2:
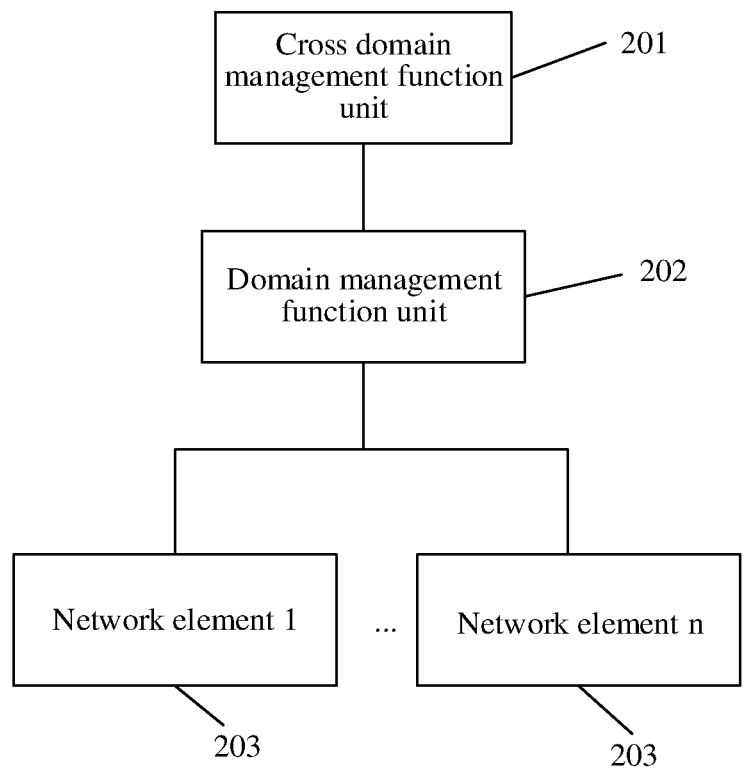
FIG. 2 is a schematic diagram of an architecture of another system for training a management and control model according to an embodiment of this application.

FIG. 2 is a schematic diagram of an architecture of still another system for training a management and control model according to an embodiment of this application. A cross domain management function unit 201 (for example, an operator-level network management unit) is the first network management unit in FIG. 1, and a domain management function unit 202 (for example, a network management unit at a level of a subordinate unit of an operator) is the second network management unit in FIG. 1. The cross domain management function unit 201 manages the domain management function unit 202 (there may be a plurality of domain management function units, and only one domain management function unit is shown in the figure). The domain management function unit 202 manages a network element 203. In a model training management and control process, the cross domain management function unit 201 determines configuration information, and sends the configuration information to the domain management function unit 202, and the domain management function unit 202 performs model training based on the configuration information, to obtain network model information; or the domain management function unit 202 sends the configuration information to the network element 203, so that the network element performs model training based on the configuration information.

Figure 3:
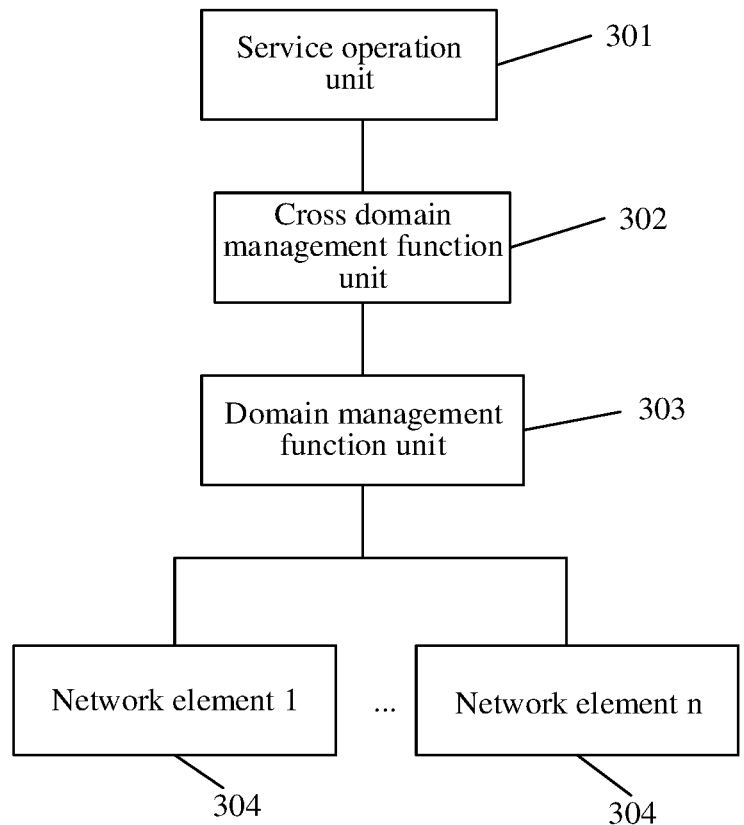
FIG. 3 is a schematic diagram of an architecture of still another system for training a management and control model according to an embodiment of this application.

FIG. 3 is a schematic diagram of an architecture of still another system for managing and controlling model training according to an embodiment of this application. The system for managing and controlling model training includes a service operation unit 301, a cross domain management function unit 302, a domain management function unit 303, and a network element 304. The cross domain management function unit 302 is the first network management unit in FIG. 1. The management function unit 303 is the second network management unit in FIG. 1. The cross domain management function unit 302 may manage one or more domain management function units 303 (one domain management function unit 303 is shown in the figure), and the domain management function unit 303 further manages the network element 304 connected to the domain management function unit 303.

The service operation unit 301 may also be referred to as a communication service management function unit, and may provide functions and management services such as charging, settlement, accounting, customer service, business, network monitoring, communication service life cycle management, and service intent translation. The service operation unit may include an operating system of an operator or a vertical operational technology system. The service operation unit 301 may determine configuration information, and deliver the configuration information to the cross domain management function unit 302, and the cross domain management function unit 302 forwards the configuration information to the domain management function unit 303; or a user may input the configuration information through the service operation unit 301, and the service operation unit 301 delivers the configuration information to the cross domain management function unit 302, and the cross domain management function unit 302 forwards the configuration information to the domain management function unit 303.

The cross domain management function unit 302 provides one or more of the following functions or management services: network life cycle management, network deployment, network fault management, network performance management, network configuration management, network assurance, a network optimization function, translation of an intent from communication service provider (intent-CSP), translation of an intent from communication service consumer (intent-CSC), network AI model training, network AI model inference, and the like. The network herein may include one or more network elements, subnets, or network slices. For example, the cross domain management function unit 302 may be a network slice management function (NSMF), a management data analytical function (MDAF), a cross domain self-organization network function (SON-function), or a cross domain intent management function unit.

It should be noted that, in some deployment scenarios, the cross domain management function unit may also provide one or more of the following management functions or management services: subnet life cycle management, subnet deployment, subnet fault management, subnet performance management, subnet configuration management, subnet assurance, a subnet optimization function, a subnet intent translation function, and the like. The subnet may include a plurality of small subnets or include a plurality of network slice subnets. For example, an access network subnet of an operator includes an access network subnet of a first vendor and an access network subnet of a second vendor.

The domain management function unit 303 provides one or more of the following functions or management services: life cycle management of a subnet or a network element, deployment of a subnet or a network element, fault management of a subnet or a network element, performance management of a subnet or a network element, assurance of a subnet or a network element, optimization management of a subnet or a network element, an intent translation of a subnet or a network element, network AI model training, and a network AI model inference. The subnet herein includes one or more network elements. Alternatively, the subnet herein may include one or more subnets, that is, the one or more subnets form a subnet with a larger coverage area. Alternatively, the subnet herein may include one or more network slice subnets. A subnet may be described in one of the following ways:

A network in a technical domain, such as a radio access network, a core network, and a transmission network.

A network of a format, for example, a GSM network, an LTE network, or a 5G network.

A network provided by a vendor, for example, a network provided by a vendor X.

A network in a geographical area, for example, a network of a factory A or a network of a city B.

The network element (NE) 304 is an entity that provides a network service, including a core network element, an access network element, and the like. The network element NE in this solution may further provide at least one of two functions: network AI model training and network AI model inference. For example, the core network element may include, but is not limited to, an access and mobility management function (AMF) entity, a session management function (SMF) entity, a policy control function (PCF) entity, a network data analysis function (NWDAF) entity, a network repository function (NRF), a gateway, and the like. The access network element may include but is not limited to: various types of base stations (for example, a generation NodeB (gNB), an evolved NodeB (eNB), a central unit control panel (CUCP), a central unit (CU), a distributed unit (DU), and a central unit user panel (CUUP)). In this solution, the net function (NF) is also referred to as network element NE.

The net element data analysis function (NEDAF) in this solution may be an independent network element or a logical function of a network element. This solution is not limited. It should be noted that the net element data analysis function in this solution may also be referred to as a network element inference function or an intelligent function, and a name is not limited.

With reference to the system architectures shown in FIG. 1 to FIG. 3, the following describes in detail the method for training a management and control model in this solution.

Figure 4:
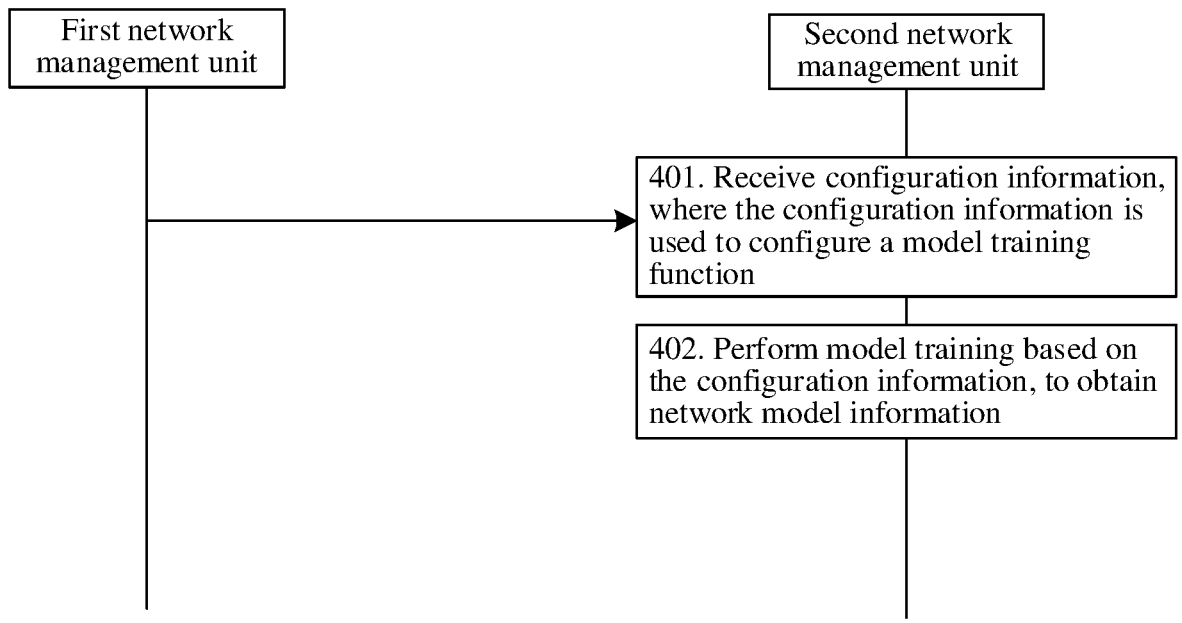
FIG. 4 is a schematic flowchart of a method for training a management and control model according to an embodiment of this application.

FIG. 4 is a schematic flowchart of a method for training a management and control model according to an embodiment of this application. As shown in FIG. 4, the method is applied to a second network management unit, and may include steps 401 to 402. Details are as follows:

401. A second network management unit receives configuration information from a first network management unit, where the configuration information is used to configure a model training function, and the configuration information includes at least one of the following information:

(A) state information, for activating or deactivating the model training function;

(B) trigger information, for triggering model training; and (C) data information, indicating data for model training.

Optionally, the first network management unit may be a cross domain management function unit Cross-Domain MnF. The second network management unit may be a domain management function unit Domain MnF. The cross domain management function unit Cross-Domain MnF determines configuration information of a training function of a network AI model. The configuration information of the training function of the network AI model may be manually input into the Cross-Domain MnF, or may be generated through internal calculation and analysis of the Cross-Domain MnF.

The model training function may be a training function of a model, or may be a training function of a plurality of models.

The following describes the configuration information.

In an optional implementation, the configuration information may include (A) state information, for activating or deactivating the model training function. In other words, the state information is for describing a state of the network AI model training function, and may include three states: an activated state, a deactivated state, and an ongoing state. For example, an operator may activate or deactivate the network AI model training function.

The foregoing state information enables the operator to flexibly activate or deactivate a corresponding network AI model training function.

In another optional implementation, the configuration information may include: (B) trigger information, for triggering model training.

Specifically, the (B) trigger information includes at least one of the following:

A training period, indicating a model training period. For example, the training period indicates that the network AI model training function needs to perform training based on an exemplary period, for example, the exemplary period is hourly, daily, or weekly.

A training time, indicating a model training time. For example, the training time indicates that the network AI model training function performs training at an exemplary time point. Herein, only the training time is used as an example for description. The training time may be another condition. For example, when model inference or analysis is performed by using a network AI model, and an obtained result does not meet a preset requirement, that is, the analysis result is inaccurate, training is triggered. The model inference, also referred to as intelligent analysis, may be understood as: providing an analysis result by using a model. For example, a network configuration parameter set is determined based on a current network environment.

Training indication information, indicating to start model training, that is, the network model training is performed immediately.

The trigger information enables an operator to configure trigger information of the network AI model training.

In yet another optional implementation, the configuration information may include: (C) data information, indicating data for model training. Specifically, the data information includes:

input data, indicating an input data type of the model; and output data, indicating an output data type of the model.

For example, if a massive multiple input multiple output (Massive MIMO) mode optimization model is supported, the input data may be a reference signal received power (RSRP), a signal to interference plus noise ratio (SINR), and a downlink/uplink throughput (DL/UL throughput); and the output data may be a tilt angle, an azimuth, and the like in a massive MIMO pattern coverage scenario.

The data information enables the operator to configure a network AI model training data type.

Further, the data information further includes a granularity of corresponding training data, that is, a training data type of the corresponding granularity. The granularity includes a cell, a grid, a tracking area, a network slice, a service, and the like.

The configuration information further includes at least one of the following:
- (D) data source information, indicating a data source for model training, where the data source is an entity that provides training data, and may be a network element list, a management function unit list, a database list, or the like; and
- the data source information enables the operator to configure a network AI model training data source as required;
- (E) model information associated with the model training function, indicating a model for model training, where for example, the associated network AI model information indicates an output network AI model object, for example, may be an identifier of the network AI model object; and
- the model information associated with the model training function enables the operator to configure a network AI model for model training; and
- (F) type information of a model, indicating a model type for model training, where the type information of the model includes at least one of the following: a load information analysis model, a service experience analysis model, a network performance analysis model, a congestion analysis model, a quality of service (QOS) analysis model, an energy saving analysis model, a traffic direction analysis model, a massive multiple input multiple output Massive MIMO analysis model, and a user equipment (UE) track analysis model; and
- the type information of the model enables the operator to flexibly configure a type supported by the network AI model training function.

The configuration information further includes: (G) intelligent analysis function information associated with the model training function may be further included, indicating that the intelligent analysis function of the network AI model may be used, where the associated intelligent analysis function information herein indicates that information about an intelligent analysis function of a network model that is obtained through training can be used.

The foregoing uses only some configuration information as an example for description, and the configuration information may further include other configuration information. This is not specifically limited in this solution.

The second network management unit receives the configuration information from the first network management unit may be that: the second network management unit receives a creation request for a management and control object of a model training function sent by the first network management unit, where the creation request for a management and control object of a model training function carries an identifier of the management and control object of the model training function and configuration information.

The management and control object of the model training function is management and control information of the model training function. Refer to Table 1. For example, the Domain MnF writes the received management and control information of the network AI model training function into a corresponding field. The network AI model training function on the Domain MnF performs the network AI model training based on information configured in a management and control object of the network AI model training function.

When the domain management function unit configures the received management and control information about the network AI model training function in the management and control object of the network AI model training function Training Function, if the model training management and control object does not exist in the domain management function unit, the management and control object of the network AI model training function Training Function is first created before the management and control object of the network AI model training function is configured, so as to configure the configuration information in the model training management and control object; if the model training management and control object exists in the domain management function unit, the configuration information is configured in an existing model training management and control object.

The information about the network AI model training function object is shown in Table 1 below.

TABLE 1

| Attribute name | Whether an attribute value is readable | Whether the attribute value is configurable |
|---|---|---|
| Training function management and control Object identifier | Yes | Yes |
| Training state | Yes | Yes |
| Supported AI model types | Yes | Yes |
| Training period | Yes | Yes |
| Training trigger condition | Yes | Yes |
| Training indication information | Yes | Yes |
| Training data | Yes | Yes |
| Training data source | Yes | Yes |
| Associated intelligent analysis function | Yes | Yes |
| Associated AI model | Yes | Yes |

402. The second network management unit performs model training based on the configuration information, to obtain network model information.

Step 402 may include steps 4021 to 4022, which are as follows:

4021. The second network management unit configures a model training function based on the configuration information.

Based on the foregoing different configuration information, the domain management function unit may perform different configurations of the model training function.

(a) When the configuration information includes the (A) state information, the domain management function unit configures the model training function based on the configuration information, which is as follows:

When the Cross-Domain MnF needs the network AI model training function to be in a working state, that is, the network AI model training function is activated, the domain management function unit configures the state information of the corresponding network AI model training function to be activated.

When the Cross-Domain MnF needs to prohibit use of the network AI model training function, that is, the network AI model training function is deactivated, the domain management function unit configures the state information of the corresponding network AI model training function to be deactivated.

(b) When the configuration information includes the (B) trigger information, the domain management function unit configures the model training function based on the configuration information, which is as follows:

When the Cross-Domain MnF needs to perform periodic training by using the network AI model training function, the domain management function unit configures the training period of the network AI model.

When the Cross-Domain MnF needs to perform training when the network AI model training function meets a condition, the domain management function unit configures a training trigger condition of the network AI model.

When the Cross-Domain MnF needs to immediately perform training by using the network AI model training function, the domain management function unit configures a network AI model training indication to be True.

(c) When the configuration information includes the (C) data information, the domain management function unit configures the model training function based on the configuration information, which is as follows:

When the Cross-Domain MnF needs to modify the type of the network AI model training data, or add or reduce the type of the network AI model training data, the type of the network AI model training data needs to be configured.

(d) When the configuration information includes the (D) data source information, the domain management function unit configures the model training function based on the configuration information, which is as follows:

When the Cross-Domain MnF needs to modify the network AI model training data source, or add or reduce the network AI model training data source, the domain management function unit configures the network AI model training data source.

(e) When the configuration information includes the (E) associated model information, the domain management function unit configures the model training function based on the configuration information, which is as follows:

When the Cross-Domain MnF needs to modify, or add or reduce the associated network AI model, the domain management function unit configures the network AI model information.

(f) When the configuration information includes the (F) type information of a model, the domain management function unit configures the model training function based on the configuration information, which is as follows:

When the Cross-Domain MnF needs the network AI model training function to add training (for example, a load information analysis model) that supports a type of network AI model, the domain management function unit adds a network AI model type (that is, a load information analysis model) that needs to be added to the network AI model type list.

When the Cross-Domain MnF needs the network AI model training function to no longer support training of a type of network AI model (for example, an energy saving analysis model), the domain management function unit deletes the network AI model type (that is, an energy saving analysis model) from the network AI model type list.

(g) When the configuration information includes the (G) intelligent analysis function information associated with the model training function, the domain management function unit configures the model training function based on the configuration information, which is as follows:

When the Cross-Domain MnF needs to modify, add, or reduce an associated intelligent analysis function, the domain management function unit configures information about the intelligent analysis function in the associated intelligent analysis function information.

The foregoing uses only some configuration information as an example for description, and the configuration information may further include other configuration information. This is not specifically limited in this solution.

In an optional implementation, the Domain MnF configures state information of the network AI model training function. If the model training is performed on the Domain MnF, the state information is directly configured on the Domain MnF. If the model training is performed on a network element, the Domain MnF sends the state information of the network AI model training function to the network element, so as to configure the state information of the network AI model training function on the network element.

In an optional implementation, the Domain MnF configures a network AI model type supported by the network AI model training function for training. If model training is performed on the Domain MnF, the network AI model type supported by the network AI model training function for training is directly configured on the Domain MnF. If model training is performed on a network element, the Domain MnF sends the network AI model type that is supported by the network AI model training function for training to the network element, so that the network AI model type that is supported by the network AI model training function for training is configured on the network element. The network AI model type indicates that the network AI model training function may train the network AI model of the type.

In an optional implementation, the Domain MnF configures the network AI model training trigger information of the network AI model training function. If the model training is performed on the Domain MnF, the network AI model training trigger information of the network AI model training function is directly configured on the Domain MnF. If model training is performed on a network element, the Domain MnF sends the network AI model training trigger information to the network element, so that the network AI model training trigger information of the network AI model training function is configured on the network element. The network AI model training trigger information indicates the network AI model training function to perform network AI model training based on the training trigger information.

In an optional implementation, the Domain MnF configures training data of the network AI model training function. If model training is performed on the Domain MnF, the training data is directly configured on the Domain MnF. If model training is performed on a network element, the Domain MnF sends the training data to the network element, so that the training data is configured on the network element. The training data indicates that the network AI model training function may use the training data to perform network AI model training.

In an optional implementation, the Domain MnF configures a training data source of the network AI model training function. If model training is performed on the Domain MnF, the training data source is directly configured on the Domain MnF. If model training is performed on a network element, the Domain MnF sends the training data source to the network element, so that the training data source is configured on the network element. The training data source indicates that the network AI model training function may use data of the data source to perform network AI model training.

In an optional implementation, the Domain MnF configures the intelligent analysis function information associated with the network AI model training function. If model training is performed on the Domain MnF, the intelligent analysis function information associated with the network AI model training function is directly configured on the Domain MnF. If model training is performed on a network element, the Domain MnF sends the intelligent analysis function information associated with the network AI model training function to the network element, so that the intelligent analysis function information associated with the network AI model training function is configured on the network element. The intelligent analysis function information associated with the foregoing network AI model training function indicates that the network AI model obtained through training by the network AI model training function may be used by the associated intelligent analysis function.

In an optional implementation, the Domain MnF configures the network AI model information associated with the network AI model training function. If the model training is performed on the Domain MnF, the network AI model information associated with the network AI model training function is directly configured on the Domain MnF. If model training is performed on a network element, the Domain MnF sends the network AI model information associated with the network AI model training function to the network element, so that the network AI model information associated with the network AI model training function is configured on the network element. The network AI model information associated with the network AI model training function indicates that the network AI model training function may update or retrain the network AI model.

Further, the second network management unit further sends a configuration result to the first network management unit.

By using this operation, the first network management unit knows a configuration status, and if the configuration fails, the configuration operation may be performed again.

4022. The second network management unit performs model training based on the model training function obtained after configuration, to obtain network model information.

For example, when the management and control object of the network AI model training function configures a network AI model training period, the Domain MnF starts network AI model training when the corresponding period expires.

When a management and control object of the network AI model training function configures a network AI model training trigger condition, the Domain MnF starts network AI model training when the corresponding trigger condition is met.

When the management and control object of the network AI model training function configures the network AI model training triggering indication information to be True, the Domain MnF starts network AI model training. Optionally, when training is completed, the network AI model training triggering indication information in the management and control object of the network AI model training function is configured to be False.

The network model information includes at least one of the following: a network model identifier, a network model version, a network model file storage address, and a network model file name.

The network model identifier is, for example, a network model 1I. The network model version may be, for example, v1.0.0. The network model file storage address may be, for example, a uniform resource identifier (URI) or an Internet Protocol (IP) address. The network model file name may be, for example, a name of the network model file.

In an optional implementation, the Domain MnF stores the network model information.

Optionally, if the corresponding network AI model object does not exist in the Domain MnF, the Domain MnF first creates the network AI model object, and then configures the network AI model information in the network AI model object.

If the network AI model object information has been configured in the management and control object of the network AI model training function, the network AI model information is configured in the corresponding network AI model object.

After obtaining the network model information, the Domain MnF configures the network model information of the network model object, so as to use the model subsequently.

In an optional implementation, the Domain MnF further sends the network model information to the Cross-Domain MnF. For example, the Domain MnF sends a network AI model addition or change notification to the Cross Domain MnF, where the notification may carry the network AI model information. According to this method, the Cross-Domain MnF may obtain the network AI model information output by training in real time.

In an optional implementation, the method further includes:
    determining, by the second network management unit, association information between the configuration information and the network model information; and
    sending, by the second network management unit, the association information to the first network management unit.

The association information between the configuration information and the network model information may be understood as follows: The network model information is obtained through training based on one or more pieces of configuration information, and the one or more pieces of configuration information has an association relationship with the network model information.

According to this embodiment of this application, the second network management unit configures the model training function based on the received configuration information sent by the first network management unit, to perform model training based on the configuration information, to obtain the network model information. According to this method, an operator can flexibly configure a corresponding network AI model training function, so that network model training can be managed and controlled, thereby improving the efficiency of management and control model training and saving manpower. By using this solution, the operator is enabled to centrally manage and control all supported network AI model training and implement differentiated management and control on different supported network AI model training.

Figure 5:
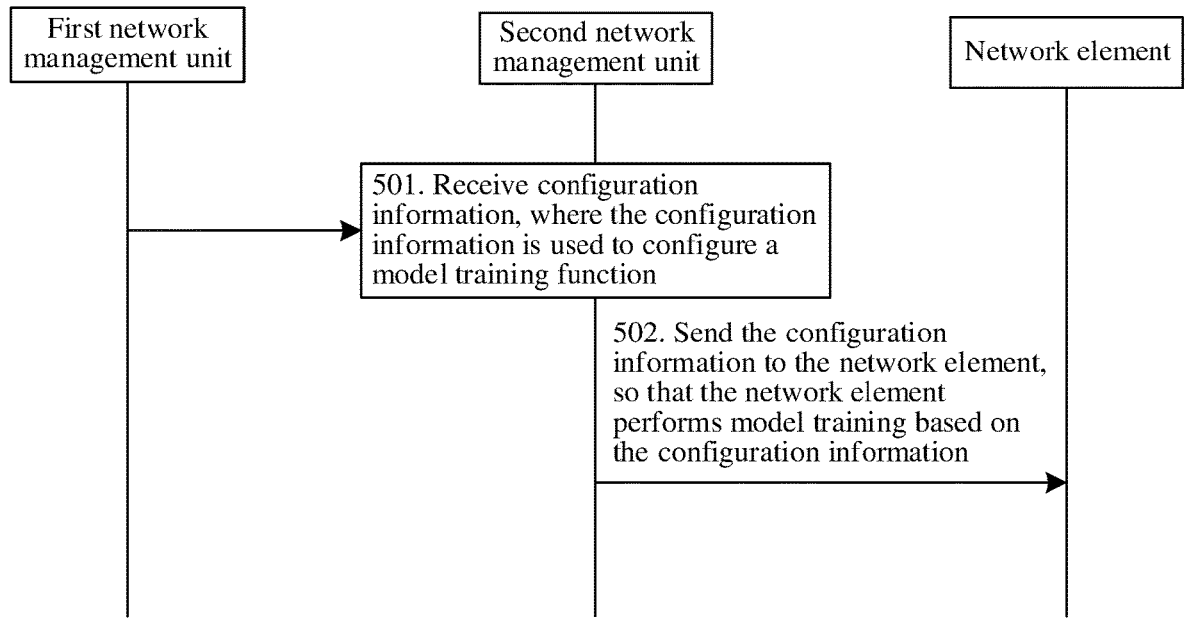
FIG. 5 is a schematic flowchart of another method for training a management and control model according to an embodiment of this application.

FIG. 5 is a schematic flowchart of still another method for training a management and control model according to an embodiment of this application. As shown in FIG. 5, the method is applied to a second network management unit, and may include steps 501 to 502. Details are as follows:

501. A second network management unit receives configuration information from a first network management unit, where the configuration information is used to configure a model training function, and the configuration information includes at least one of the following information:
    (A) state information, for activating or deactivating the model training function;
    (B) trigger information, for triggering model training; and
    (C) data information, indicating data for model training.

Optionally, the first network management unit may be a cross domain management function unit Cross-Domain MnF. The second network management unit may be a domain management function unit Domain MnF. The cross domain management function unit Cross-Domain MnF determines configuration information of a training function of a network AI model. The configuration information of the training function of the network AI model may be manually input into the Cross-Domain MnF, or may be generated through internal calculation and analysis of the Cross-Domain MnF.

The model training function may be a training function of a model, or may be a training function of a plurality of models.

For a description of the configuration information, refer to the embodiment shown in FIG. 4. Details are not described herein again.

502. The second network management unit sends the configuration information to a network element, so that the network element performs model training based on the configuration information.

When model training is performed on the network element, the domain management function unit sends the configuration information to the network element, so that the network element configures model training function based on the configuration information, and performs model training.

In an optional implementation, the second network management unit receives the network model information sent by the network element. The network model information includes at least one of the following: a network model identifier, a network model version, a network model file storage address, and a network model file name.

In an optional implementation, the Domain MnF stores the network model information.

Optionally, if the corresponding network AI model object does not exist in the Domain MnF, the Domain MnF first creates the network AI model object, and then configures the network AI model information in the network AI model object.

If the network AI model object information has been configured in the management and control object of the network AI model training function, the network AI model information is configured in the corresponding network AI model object.

After obtaining the network model information, the Domain MnF configures the network model information of the network model object, so as to use the model.

In an optional implementation, the Domain MnF further sends the network model information to the Cross-Domain MnF. For example, the Domain MnF sends a network AI model addition or change notification to the Cross Domain MnF, where the notification may carry the network AI model information. According to this method, the Cross-Domain MnF may obtain the network AI model information output by training in real time.

In an optional implementation, the method further includes:
 determining, by the second network management unit, association information between the configuration information and the network model information; and
 sending, by the second network management unit, the association information to the first network management unit.

The association information between the configuration information and the network model information may be understood as follows: The network model information is obtained through training based on one or more pieces of configuration information, and the one or more pieces of configuration information has an association relationship with the network model information.

According to this embodiment of this application, the second network management unit sends, based on the received configuration information sent by the first network management unit, the configuration information to the network element, so that the network element performs model training based on the configuration information. According to this method, network model training can be managed and controlled, and the operator can flexibly configure a corresponding network AI model training function.

Figure 6:
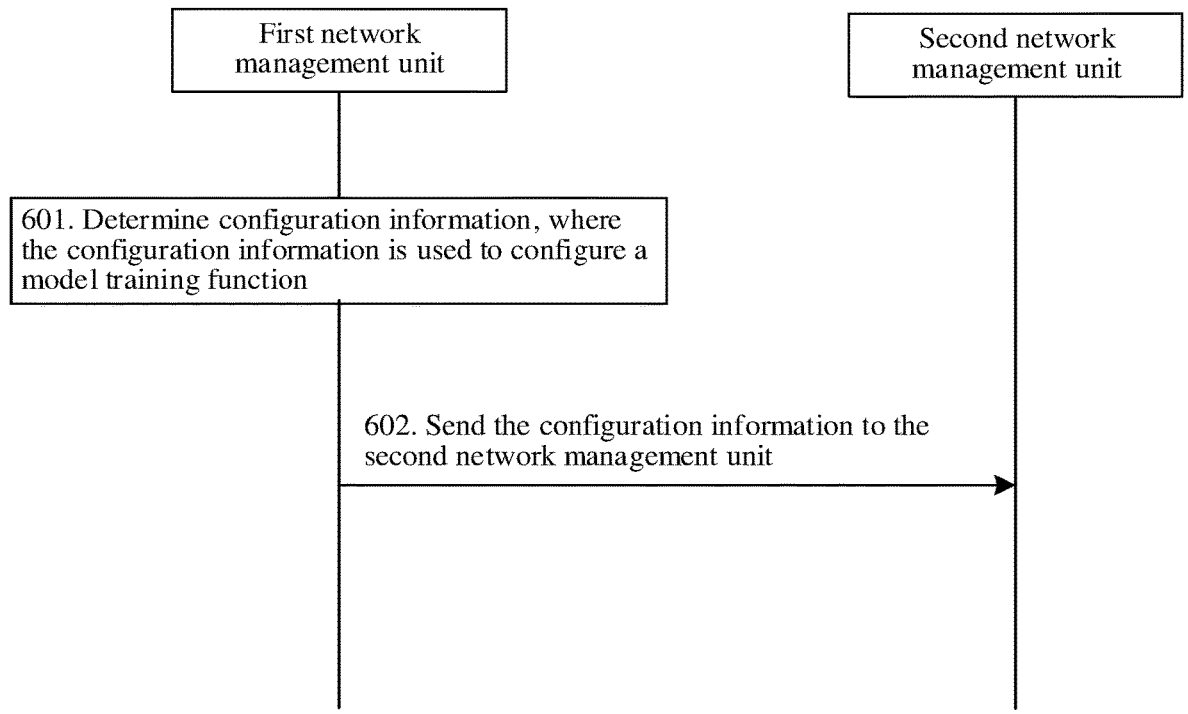
FIG. 6 is a schematic flowchart of still another method for training a management and control model according to an embodiment of this application.

FIG. 6 is a schematic flowchart of another method for training a management and control model according to an embodiment of this application. As shown in FIG. 6, the method is applied to a first network management unit, and may include steps 601 to 602. Details are as follows:

601. A first network management unit determines configuration information, where the configuration information is used to configure a model training function, and the configuration information includes at least one of the following information:
 (A) state information, for activating or deactivating the model training function;
 (B) trigger information, for triggering model training; and
 (C) data information, indicating data for model training.

Optionally, the first network management unit may be a cross domain management function unit Cross-Domain MnF. The second network management unit may be a domain management function unit Domain MnF. The cross domain management function unit Cross-Domain MnF determines configuration information of a training function of a network AI model. The configuration information of the training function of the network AI model may be manually input into the Cross-Domain MnF, or may be generated through internal calculation and analysis of the Cross-Domain MnF.

The model training function may be a training function of a model, or may be a training function of a plurality of models.

For a related description of the configuration information, refer to the foregoing description in FIG. 4. Details are not described herein again.

602. The first network management unit sends the configuration information to a second network management unit.

In an optional implementation, the method further includes:
 receiving, by the first network management unit, network model information sent by the second network management unit, where the network model information is obtained after the second network management unit performs training based on the configuration information.

In another optional implementation, the method further includes:
 receiving, by the first network management unit, network model information sent by the second network management unit, where the network model information is obtained after a network element performs training based on the configuration information, and the configuration information is received by the network element from the second network management unit.

In other words, the model training may be obtained by the second network management unit through training, or may be obtained by the network element through training.

The network model information includes at least one of the following: a network model identifier, a network model version, a network model file storage address, and a network model file name.

In still another optional implementation, the method further includes:

receiving, by the first network management unit, association information sent by the second network management unit, where the association information is association information between the configuration information and the network model information.

According to this embodiment of this application, the first network management unit determines the configuration information of the model training function, and sends the configuration information to the second network management unit. According to this method, network model training can be managed and controlled, and the operator can flexibly configure a corresponding network AI model training function.

Figure 7:
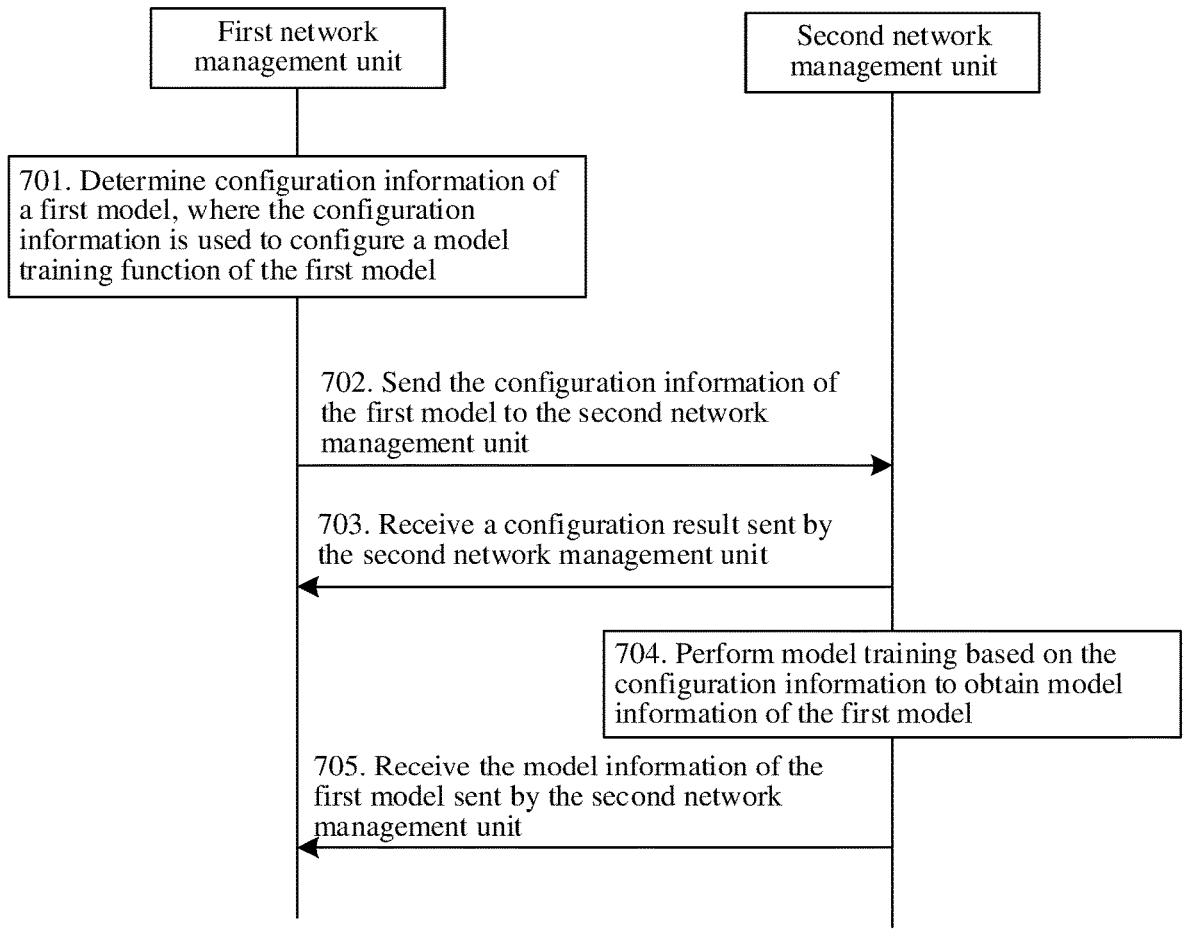
FIG. 7 is a schematic flowchart of another method for training a management and control model according to an embodiment of this application.

FIG. 7 is a schematic flowchart of a method for training a management and control model according to an embodiment of this application. As shown in FIG. 7, the method may include steps 701 to 705, which are as follows:

701. A first network management unit determines configuration information of a first model, where the configuration information is used to configure a model training function of the first model, and the configuration information includes at least one of the following information:

(A) state information, for activating or deactivating the model training function;
(B) trigger information, for triggering model training; and
(C) data information, indicating data for model training.

The first model may be any type of model. Optionally, for example, the first model is identified by using a distinguished name (DN). Another manner may also be used, and this is not specifically limited in this solution.

702. The first network management unit sends the configuration information of the first model to a second network management unit.

703. The first network management unit receives a configuration result sent by the second network management unit.

For example, the Domain MnF returns the configuration result of the model training function of the first network. By using this operation, the first network management unit knows a configuration status, and if the configuration fails, the configuration operation may be performed again.

704. The second network management unit performs model training based on the configuration information, to obtain model information of the first model.

705. The first network management unit receives the model information of the first model sent by the second network management unit.

According to this embodiment of this application, the first network management unit can flexibly control a network AI model training, and can also obtain network AI model information output by training in real time. According to this method, the operator is enabled to differentiate and control training of different network AI models on the network AI model training function.

Figure 8:
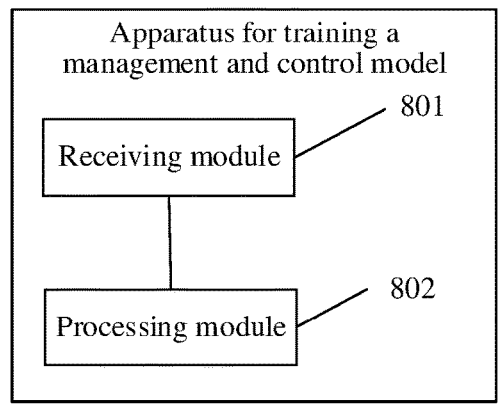
FIG. 8 is a schematic diagram of a structure of an apparatus for training a management and control model according to an embodiment of this application.

FIG. 8 is a schematic diagram of a structure of an apparatus for training a management and control model according to an embodiment of this application. As shown in FIG. 8, the apparatus includes a receiving module 801 and a processing module 802, which are as follows:

The receiving module 801 is configured to receive configuration information from a first network management unit, where the configuration information is used to configure a model training function, and the configuration information includes at least one of the following information:

state information, for activating or deactivating the model training function;
trigger information, for triggering model training; and
data information, indicating data for model training; and
the processing module 802 is configured to perform model training based on the configuration information, to obtain network model information.

In an optional implementation, the configuration information further includes at least one of the following:

data source information, indicating a data source for model training;
model information associated with the model training function, indicating a model for model training; and
type information of a model, indicating a model type for model training.

In an optional implementation, the network model information includes at least one of the following: a network model identifier, a network model version, a network model file storage address, and a network model file name.

In an optional implementation, the apparatus further includes:

a sending module, configured to send the network model information to the first network management unit.

In another optional implementation, the apparatus further includes:

a determining module, configured to determine association information between the configuration information and the network model information, and send the association information to the first network management unit.

The trigger information includes at least one of the following:

a training period, indicating a model training period;
a training time, indicating a model training time; and
training indication information, indicating to start model training.

In an optional implementation, the data information includes:

input data, indicating an input data type of the model; and
output data, indicating an output data type of the model.

For an exemplary implementation of the foregoing modules, refer to the foregoing embodiments. Details are not described herein again.

Figure 9:
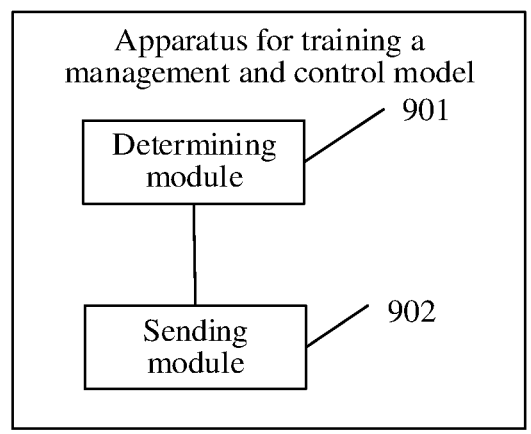
FIG. 9 is a schematic diagram of a structure of another apparatus for training a management and control model according to an embodiment of this application.

FIG. 9 is a schematic diagram of a structure of another apparatus for training a management and control model according to an embodiment of this application. As shown in FIG. 9, the apparatus includes a determining module 901 and a sending module 902. Details are as follows:

The determining module 901 is configured to determine configuration information, where the configuration information is used to configure a model training function, and the configuration information includes at least one of the following information:

state information, for activating or deactivating the model training function;
trigger information, for triggering model training; and
data information, indicating data for model training; and
the sending module 902 is configured to send the configuration information to a second network management unit.

In an optional implementation, the configuration information further includes at least one of the following:

data source information, indicating a data source for model training;

model information associated with the model training function, indicating a model for model training; and type information of a model, indicating a model type for model training.

In an optional implementation, the apparatus further includes:

a receiving module, configured to receive network model information sent by the second network management unit, where the network model information is obtained after the second network management unit performs training based on the configuration information, or the network model information is obtained after a network element performs training based on the configuration information, and the configuration information is received by the network element from the second network management unit.

In an optional implementation, the network model information includes at least one of the following: a network model identifier, a network model version, a network model file storage address, and a network model file name.

In another optional implementation, the receiving module is further configured to:

receive association information sent by the second network management unit, where the association information is association information between the configuration information and the network model information.

In another optional implementation, the trigger information includes at least one of the following:

a training period, indicating a model training period;

a training time, indicating a model training time; and training indication information, indicating to start model training.

In still another optional implementation, the data information includes:

input data, indicating an input data type of the model; and output data, indicating an output data type of the model.

For an exemplary implementation of the foregoing modules, refer to the foregoing embodiments. Details are not described herein again.

Figure 10:
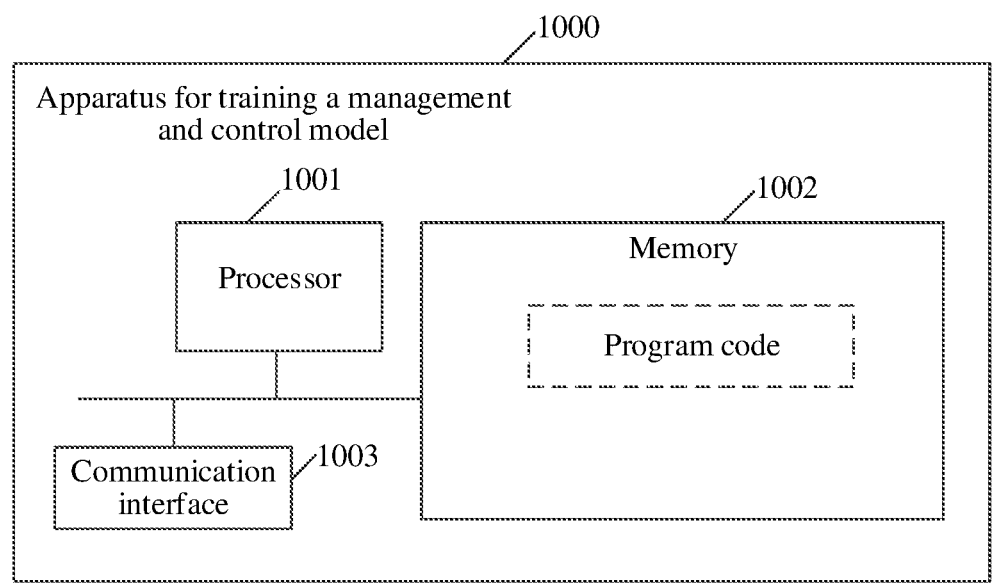
FIG. 10 is a schematic diagram of a structure of another apparatus for training a management and control model according to an embodiment of this application.

FIG. 10 is a schematic diagram of a structure of still another apparatus for training a management and control model according to an embodiment of this application. As shown in FIG. 10, an apparatus for training a management and control model 1000 includes at least one processor 1001, at least one memory 1002, and at least one communication interface 1003. The processor 1001, the memory 1002, and the communication interface 1003 are connected to and communicate with each other through a communication bus.

The processor 1001 may be a general-purpose central processing unit (CPU), a microprocessor, an application-specific integrated circuit (ASIC), or one or more integrated circuits configured to control program execution of the foregoing solution.

The communication interface 1003 is configured to communicate with another device or a communication network such as the Ethernet, a radio access network (RAN), or a wireless local area network (WLAN).

The memory 1002 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that can be accessed by a computer. However, this is not limited thereto. The memory may exist independently, and is connected to the processor through the bus. The memory may alternatively be integrated with the processor.

The memory 1002 is configured to store application program code used to execute the foregoing solution, and the processor 1001 controls the execution. The processor 1001 is configured to execute the application program code stored in the memory 1002.

The code stored in the memory 1002 may be used to perform the method for training a management and control model provided above.

An embodiment of this application further provides a chip system. The chip system is used in an electronic device. The chip system includes one or more interface circuits and one or more processors. The interface circuit and the processor are connected to each other through a line. The interface circuit is configured to receive a signal from a memory of the electronic device, and send the signal to the processor. The signal includes computer instructions stored in the memory. When the processor executes the computer instructions, the electronic device performs the methods.

An embodiment of this application further provides a computer-readable storage medium. The computer-readable storage medium stores instructions. When the instructions are run on a computer or a processor, the computer or the processor is enabled to perform one or more steps in any one of the foregoing methods.

An embodiment of this application further provides a computer program product including instructions. When the computer program product is run on a computer or a processor, the computer or the processor is enabled to perform one or more steps in any one of the foregoing methods.

An embodiment of this application further provides a system for managing and controlling model training, including one or more modules in any one of the foregoing apparatuses.

It may be understood by a person skilled in the art that, for the purpose of convenient and brief description, for a detailed working process of the foregoing system, apparatus, and unit, refer to a corresponding process in the foregoing method embodiments. Details are not described herein again.

It should be understood that unless otherwise specified, "/" in descriptions of this application indicates an "or" relationship between associated objects. For example, A/B may indicate A or B. A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to describe embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

In the several embodiments provided in this application, it should be understood that the disclosed system, apparatus, and method may be implemented in other manners. For example, division into the units is merely logical function division and may be another division in actual implementation. For example, a plurality of units or components may be combined or integrated into another system, or some features may be ignored or not performed. The displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium, or transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a read-only memory (ROM), a random access memory (RAM), or a magnetic medium, for example, a floppy disk, a hard disk, a magnetic tape, a magnetic disk, or an optical medium, for example, a digital versatile disc (DVD), or a semiconductor medium, for example, a solid-state disk (SSD).

The foregoing descriptions are merely exemplary implementations of embodiments of this application, but are not intended to limit the protection scope of embodiments of this application. Any variation or replacement within the scope disclosed in embodiments of this application shall fall within the protection scope of embodiments of this application. Therefore, the protection scope of embodiments of this application shall be subject to the protection scope of the claims.

What is claimed is:

1. A method for training a management and control model, the method comprising:
    receiving, by a second network management apparatus, configuration information from a first network management apparatus,
        wherein the configuration information is for configuring a network model training function, and
        wherein the configuration information comprises the following information:
            state information, for activating or deactivating the network model training function;
            trigger information, for triggering model training; and
            data information, indicating data for model training; and
    performing, by the second network management apparatus, model training based on the configuration information, to obtain a target network model and respective target network model information,
        wherein the target network model is a data model that generates a prediction of network performance.

2. The method according to claim 1, wherein the configuration information further comprises at least one of the following information:
    data source information, indicating a data source for model training;
    model information associated with the network model training function, indicating a model for model training; and
    type information of a model, indicating a model type for model training.

3. The method according to claim 1, wherein the network model information comprises at least one of the following information:
    a network model identifier, a network model version, a network model file storage address, and a network model file name.

4. The method according to claim 1, wherein the method further comprises:
    sending, by the second network management apparatus, the target network model information to the first network management apparatus.

5. The method according to claim 1, wherein the method further comprises:
    determining, by the second network management apparatus, association information between the configuration information and the network model information; and
    sending, by the second network management apparatus, the association information to the first network management apparatus.

6. A method for training a management and control network model training function, the method comprising:
    determining, by a first network management apparatus, configuration information for configuring a network model training function,
        wherein the configuration information comprises the following information:
            state information, for activating or deactivating the network model training function;
            trigger information, for triggering model training; and data information, indicating data for model training; and sending, by the first network management apparatus, the configuration information to a second network management apparatus.

7. The method according to claim 6, wherein the configuration information further comprises at least one of the following information:
   data source information, indicating a data source for model training;
   model information associated with the network model training function, indicating a model for model training; and
   type information of a model, indicating a model type for model training.

8. The method according to claim 6, wherein the method further comprises:
   receiving, by the first network management apparatus, the target network model information sent by the second network management apparatus,
   wherein the target network model information is obtained after:
      the second network management apparatus performs training based on the configuration information, or
      a network element performs training based on the configuration information, and the configuration information is received by the network element from the second network management apparatus.

9. The method according to claim 8, wherein the target network model information comprises at least one of the following information:
   a network model identifier, a network model version, a network model file storage address, and a network model file name.

10. The method according to claim 8, wherein the method further comprises:
    receiving, by the first network management apparatus, association information sent by the second network management apparatus,
    wherein the association information is association information between the configuration information and the target network model information.

11. A second network management apparatus comprising:
    at least one processor; and
    a memory coupled to the at least one processor and having program instructions stored thereon which, when executed by the at least one processor, cause the second network management apparatus to:
       receive configuration information from a first network management apparatus, wherein the configuration information is for configuring a network model training function, wherein the configuration information comprises the following information:
          state information, for activating or deactivating the network model training function;
          trigger information, for triggering model training; and
          data information, indicating data for model training; and
       perform model training based on the configuration information, to obtain a target network model and respective target network model information;
       wherein the target network model is a data model that generates a prediction of network performance.

12. The second network management apparatus according to claim 11, wherein the configuration information further comprises at least one of the following information:
    data source information, indicating a data source for model training;
    model information associated with the network model training function, indicating a model for model training; and
    type information of a model, indicating a model type for model training.

13. The second network management apparatus according to claim 11, wherein the network model information comprises at least one of the following information: a network model identifier, a network model version, a network model file storage address, and a network model file name.

14. The second network management apparatus according to claim 11, wherein the program instructions further cause the second network management apparatus to:
    send the target network model information to the first network management apparatus.

15. The second network management apparatus according to claim 11, wherein the program instructions further cause the second network management apparatus to:
    determine association information between the configuration information and the network model information; and
    send the association information to the first network management apparatus.

16. A first network management apparatus comprising:
    at least one processor; and
    a memory coupled to the at least one processor and having program instructions stored thereon which, when executed by the at least one processor, cause the first network management apparatus to:
       determine configuration information for configuring a network model training function,
       wherein the configuration information comprises the following information:
          state information, for activating or deactivating the network model training function;
          trigger information, for triggering model training; and
          data information, indicating data for model training; and
       send the configuration information to a second network management apparatus.

17. The first network management apparatus according to claim 16, wherein the configuration information further comprises at least one of the following information:
    data source information, indicating a data source for model training;
    model information associated with the network model training function, indicating a model for model training; and
    type information of a model, indicating a model type for model training.

18. The first network management apparatus according to claim 16, wherein the program instructions further cause the first network management apparatus to receive network model information sent by the second network management apparatus,
    wherein the network model information is obtained after:
       the second network management apparatus performs training based on the configuration information, or
       a network element performs training based on the configuration information, and the configuration information is received by the network element from the second network management apparatus.

19. The first network management apparatus according to claim 18, wherein the network model information comprises at least one of the following information:
a network model identifier, a network model version, a network model file storage address, and a network model file name.

20. The first network management apparatus according to claim 18, wherein the program instructions further cause the first network management apparatus to:
receive association information sent by the second network management apparatus, wherein the association information is association information between the configuration information and the network model information.

* * * * *